US012679014B2

(12) United States Patent
Nakazono et al.

(10) Patent No.: US 12,679,014 B2
(45) Date of Patent: Jul. 14, 2026

(54) QUALITY PREDICTION DEVICE AND METHOD THEREFOR, NON-TRANSITORY COMPUTER READABLE MEDIUM STORING PROGRAM

(71) Applicant: SUMITOMO HEAVY INDUSTRIES, LTD., Tokyo (JP)

(72) Inventors: Masanobu Nakazono, Yokosuka (JP); Nagoshi Asakawa, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 345 days.

(21) Appl. No.: 18/335,166

(22) Filed: Jun. 15, 2023

(65) Prior Publication Data

US 2023/0321884 A1 Oct. 12, 2023

Related U.S. Application Data

(63) Continuation of application No. PCT/JP2022/014668, filed on Mar. 25, 2022.

(30) Foreign Application Priority Data

Mar. 31, 2021 (JP) ................................. 2021-062345

(51) Int. Cl.
B29C 45/76 (2006.01)
G05B 13/02 (2006.01)
G05B 13/04 (2006.01)

(52) U.S. Cl.
CPC .......... B29C 45/76 (2013.01); G05B 13/0265 (2013.01); G05B 13/048 (2013.01); B29C 2945/76943 (2013.01)

(58) Field of Classification Search
None
See application file for complete search history.

(56) References Cited

U.S. PATENT DOCUMENTS

2020/0101649 A1 4/2020 Okubo et al.
2020/0257916 A1 8/2020 Nishizawa et al.
2021/0247754 A1 8/2021 Takahashi et al.
(Continued)

FOREIGN PATENT DOCUMENTS

DE 195 14 535 A1 10/1996
DE 10 2020 209 479 A1 2/2022
JP H4-135724 A 5/1992
(Continued)

OTHER PUBLICATIONS

Office Action of the corresponding DE112022001899.2 mailed on Oct. 8, 2024.
(Continued)

*Primary Examiner* — Paul B Yanchus, III
(74) *Attorney, Agent, or Firm* — WTA IP Law P.C.

(57) ABSTRACT

A quality prediction device includes a probabilistic prediction model generation unit that generates a probabilistic prediction model on the basis of a plurality of training data in which a log relating to a molding operating condition or to a state of a molding machine and a quality value of a molding product corresponding to the log are associated with each other, and a quality prediction unit that calculates a quality index of the molding product from the log using the probabilistic prediction model.

12 Claims, 6 Drawing Sheets

(56)                    References Cited

U.S. PATENT DOCUMENTS

2023/0367304 A1* 11/2023 Horiuchi ........... G05B 23/0281

FOREIGN PATENT DOCUMENTS

| JP | 2019-084556 A | 6/2019 |
| JP | 2020-75385 A | 5/2020 |

OTHER PUBLICATIONS

International Search Report of PCT/JP2022/014668, mailed on May 17, 2022.
Office Action of the corresponding CN Application No. 202280008206.1 Mailed on Dec. 9, 2025.

* cited by examiner

QUALITY PREDICTION DEVICE AND METHOD THEREFOR, NON-TRANSITORY COMPUTER READABLE MEDIUM STORING PROGRAM

CROSS-REFERENCE TO RELATED APPLICATIONS

This is a bypass continuation of International PCT Application No. PCT/JP2022/014668, filed on Mar. 25, 2022, which claims priority to Japanese Patent Application No. 2021-062345, filed on Mar. 31, 2021, which are incorporated by reference herein in their entirety.

BACKGROUND

Technical Field

Certain embodiments of the present invention relate to a quality prediction device, a quality prediction method, and a non-transitory computer readable medium storing a program.

Description of Related Art

The related art discloses that a microcomputer built in an injection molding machine takes a monitor item, and compares an actual measured value with upper and lower limit values of the monitor item to determine the quality of a molding product.

SUMMARY

A quality prediction device according to an embodiment of the present invention includes a probabilistic prediction model generation unit that generates a probabilistic prediction model on the basis of a plurality of training data in which a log relating to a molding operating condition or to a state of a molding machine and a quality value of a molding product corresponding to the log are associated with each other, and a quality prediction unit that calculates a quality index of the molding product from the log using the probabilistic prediction model.

A quality prediction method according to another embodiment of the present invention includes generating a probabilistic prediction model on the basis of a plurality of training data in which a log relating to a molding operating condition or to a state of a molding machine and a quality value of a molding product corresponding to the log are associated with each other, and calculating a quality index of the molding product from the log using the probabilistic prediction model.

DETAILED DESCRIPTION

Figure 1:
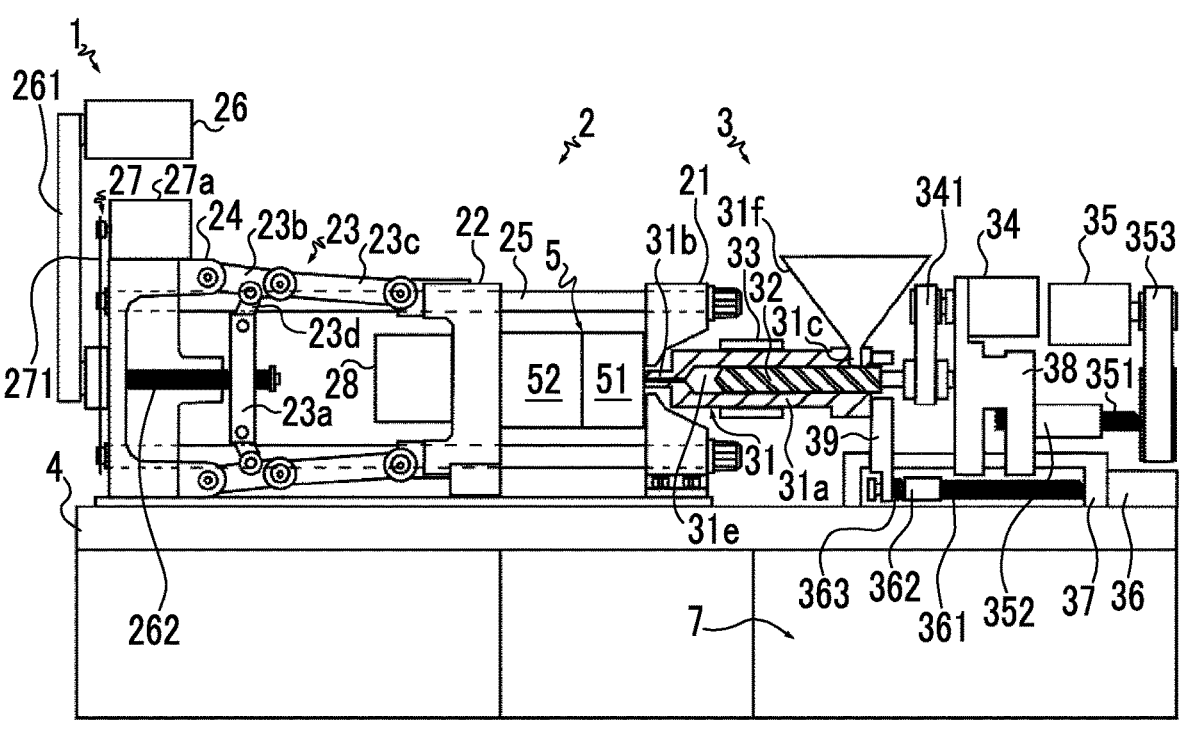
FIG. 1 is a schematic diagram showing a schematic configuration of an injection molding machine according to an embodiment of the present invention.

The molding machine may be an injection molding machine, but may be another type of molding machine, such as a die-casting machine.

The quality index may indicate an expected value and a variance of the molding product, a probability of occurrence of a desired quality of the molding product, or a probability density distribution of a quality of the molding product.

A quality may be predicted whenever the molding machine manufactures the molding product. Accordingly, a model having a low calculation cost may be employed as the probabilistic prediction model. From this point of view, a model calculated on the basis of Bayesian linear regression is preferably employed as the probabilistic prediction model.

A program used to perform this method can also be understood likewise, and the concept of the program is substantially disclosed in this specification. In addition to being downloaded from a server, the program may be recorded on a non-transitory recording medium (for example, an optical disk, a magnetic disk, a hard disk, a semiconductor memory, or the like) and distributed. The non-transitory recording medium is a tangible object that does not include a communication line through which such a program is temporarily propagated as data.

In some embodiments, a determination unit that determines necessity for inspection of the molding product on the basis of the quality index of the molding product is provided. A determination parameter used for determination of the determination unit may be adjustable. A confusion matrix may be used for the adjustment of the determination parameter. The confusion matrix may be a matrix in which the determination result of the molding quality predicted on the basis of the probabilistic prediction model is classified in light of a true molding quality.

It is desirable to provide an index that contributes to determining necessity for inspection of the molding product. In a case where only point estimation of the quality (for example, weight or the presence or absence of sink marks) of a molding product is performed, there is a concern that there may be confusion in determining the necessity for inspection and that a burden of the determination may not be reduced.

Non-limiting embodiments and characteristics of the present invention will be described below with reference to FIGS. 1 to 6. Those skilled in the art can combine the respective embodiments and/or the respective characteristics without requiring excessive description, and can also understand the synergistic effects of such combinations. In principle, the repeated description of the embodiments will be omitted. Reference drawings are mainly intended to describe the invention and are simplified for the convenience of illustration. Each characteristic is understood as a universal characteristic that is not only a characteristic effective for a quality prediction device and a quality prediction method disclosed in this specification, but a characteristic available for various other quality prediction devices and various other quality prediction methods, which are not disclosed in this specification, as well.

As shown in FIG. 1, an injection molding machine 1 includes a mold clamping unit 2 and an injection unit 3 that are mounted on a common base 4 or different bases. The injection molding machine 1 continuously manufactures molding products on the basis of the cooperative operation of the mold clamping unit 2 and the injection unit 3. The mold clamping unit 2 is adapted to repeat a loop of mold closing, mold clamping, and mold opening. The injection unit 3 is adapted to repeat a loop of a plasticizing process, a filling process, and a holding pressure process. A mold unit 5 is attached to the mold clamping unit 2. The specific configuration of the mold unit 5 is determined depending on the shapes, sizes, and the number of injection molding products. The mold unit 5 may be a two-plate type or a three-plate type. In some embodiments, the mold unit 5 includes one or more stationary molds 51 and one or more movable molds 52.

The configuration and operations of the mold clamping unit 2 and the injection unit 3 will be described in more detail. The mold clamping unit 2 includes a stationary platen 21, a movable platen 22, a toggle mechanism 23, a toggle support 24, a plurality of tie bars 25, a mold clamping motor 26, and a mold space adjustment mechanism 27. The toggle support 24 and the movable platen 22 are connected to each other via the toggle mechanism 23, and the movable platen 22 can advance and retreat with respect to the stationary platen 21 on the basis of the operation of the toggle mechanism 23. Specifically, the state of the toggle mechanism 23 is changed by the operation of the mold clamping motor 26, and the position of the movable platen 22 is changed. In a case where an interval between the stationary platen 21 and the movable platen 22 is large, the mold unit 5 can be introduced into a space between the stationary platen 21 and the movable platen 22. In this state, the stationary mold 51 and the movable mold 52 are attached to the stationary platen 21 and the movable platen 22, respectively. After that, the movable platen 22 is moved toward the stationary platen 21, and the mold unit 5 is closed, then clamped, and finally opened. The mold closing is a state in which a facing surface of the stationary mold 51 and a facing surface of the movable mold 52 are in contact with each other and a half cavity of the stationary mold 51 and a half cavity of the movable mold 52 spatially communicate with each other. The mold clamping is a state in which the movable mold 52 is strongly pressed by the stationary mold 51 to withstand the pressure of a material to be injected from the injection unit 3. The mold opening is a state in which the facing surface of the stationary mold 51 and the facing surface of the movable mold 52 are not in contact with each other and an interval is formed between the stationary mold 51 and the movable mold 52.

The toggle mechanism 23 includes a crosshead 23a that receives a driving force from the mold clamping motor 26, first and second links 23b and 23c that are pivotally coupled to each other between the toggle support 24 and the movable platen 22, and third links 23d that are coupled between the crosshead 23a and the first link 23b. A rotation force generated by the mold clamping motor 26 is converted into a linear thrust by a force conversion device, such as a ball screw 262, via a belt 261, and the thrust is applied to the crosshead 23a. For example, the crosshead 23a is moved straight toward the stationary platen 21 according to the normal rotation of an output shaft of the mold clamping motor 26, an angle between the first and second links 23b and 23c is increased, and the movable platen 22 is moved straight toward the stationary platen 21. The crosshead 23a is moved in a direction away from the stationary platen 21 according to the reverse rotation of the output shaft of the mold clamping motor 26, the angle between the first and second links 23b and 23c is reduced, and the movable platen 22 is moved straight in a direction away from the stationary platen 21. In the mold clamping unit 2, a direction in which the movable platen 22 and the movable mold 52 attached to the movable platen 22 are moved toward the stationary platen 21 and the stationary mold 51 attached to the stationary platen 21 is defined as a front side or an injection unit side, and a direction opposite thereto is defined as a rear side or a side opposite to the injection unit.

The toggle mechanism 23 operates to double the thrust applied to the crosshead 23a and to transmit the doubled thrust to the movable platen 22. A factor of the toggle mechanism 23 is also referred to as a toggle factor. The toggle factor is changed depending on the angle between the first and second links 23b and 23c. As the angle between the first and second links 23b and 23c approaches 180°, the toggle factor is also increased.

The mold space adjustment mechanism 27 is adapted to adjust the position of the toggle support 24 with respect to the stationary platen 21 (an interval between the stationary platen 21 and the toggle support 24 in a front-rear direction, so to speak, a mold space). The mold space adjustment mechanism 27 includes a mold space adjustment motor 27a. A rotation force generated by the mold space adjustment motor 27a is transmitted to nuts, which are screwed to screw shafts provided at rear end portions of the tie bars 25, via a belt 271, and the position of the toggle support 24 is changed along the tie bars 25, so that the position of the toggle support 24 with respect to the stationary platen 21 (that is, an interval between the stationary platen 21 and the toggle support 24) is changed. The rotation force of the mold space adjustment motor 27a is transmitted to the nuts via transmission elements, such as a belt and gears (or directly transmitted to the nuts).

The mold clamping unit 2 includes an ejector device 28 that is used to discharge molding products from the mold unit 5. For example, the ejector device 28 is attached to the rear side of the movable platen 22. The ejector device 28 includes ejector rods and an ejector motor that supplies power to the ejector rods. A rotation force generated by the ejector motor is converted into a linear force by a ball screw, and the linear force is transmitted to the ejector rods. In a case where the ejector rods are caused to advance, an ejector plate of the mold unit 5 is pushed by the ejector rods. Molding products of the movable mold 52 are pushed by ejector pins and are discharged from the mold unit 5. The injection molding machine 1 causes the ejector device to operate in synchronization with the mold opening.

The injection unit 3 feeds molten resin material to the mold unit 5 attached to the mold clamping unit 2. The injection unit may be an in-line screw type or a pre-plasticization type. The injection unit will be described as an in-line screw type in this specification, but is not limited thereto. The injection unit 3 includes a cylinder 31, a screw 32, a heater 33, a plasticizing motor 34, an injection motor 35, a moving motor 36, guide rails 37, a first movable support 38, and a second movable support 39.

The cylinder 31 is a tubular member that accommodates the screw 32 and is made of metal, and includes a cylinder body portion 31a and a nozzle portion 31b. The cylinder body portion 31a accommodates the screw 32. The nozzle portion 31b includes a linear flow channel that has a flow channel diameter smaller than a flow channel diameter of the cylinder body portion 31a, and includes a discharge port that discharges molten plastic material fed from the cylinder body portion 31a. The cylinder body portion 31a includes a material feed port 31c that receives a plastic material, for example, pellets fed from a hopper 31f, or an automated plastic material feeder. The pellets are melted by heat transferred from the heater 33 via the cylinder body portion 31a, and are transported to the front side, that is, toward the nozzle portion 31b according to the rotation of the screw 32. As can be understood from the following description, a moving direction of the screw 32 during filling is the front side, and a moving direction of the screw 32 during plasticizing is the rear side.

The screw 32 includes a shaft portion and a flight that is provided on an outer periphery of the shaft portion in a helical shape, and transports a solid resin material and the molten resin material to the front side of the cylinder 31 according to the rotation thereof. The screw 32 can be rotated by a rotation force received from the plasticizing motor 34. For example, an output shaft of the plasticizing motor 34 and the screw 32 are mechanically connected to each other via a belt 341. Further, the screw 32 can be moved to the front side (a side approaching the nozzle portion 31b) and to the rear side (a side away from the nozzle portion 31b) in the stationary cylinder 31 by a driving force received from the injection motor 35. For example, an output shaft of the injection motor 35 is connected to a screw shaft of a ball screw 351 via a belt 353. The first movable support 38 is fixed to a nut 352 of the ball screw 351. The screw 32 is rotatably attached to the first movable support 38. Likewise, a main body of the plasticizing motor 34 is fixed to the first movable support 38. The first movable support 38 is moved according to the operation of the injection motor 35, and the screw 32 and the plasticizing motor 34 are moved. The first movable support 38 is movably mounted on guide rails 37 fixed to the base 4. A direction toward the mold clamping unit 2 can be referred to as a front, and a direction away from the mold clamping unit 2 can be referred to as a rear.

The cylinder 31 receives a driving force from the moving motor 36 to advance toward the mold clamping unit 2 and to retreat away from the mold clamping unit 2. For example, an output shaft of the moving motor 36 is connected to a screw shaft of a ball screw 361. The second movable support 39 is coupled to a nut 362 of the ball screw 361 via an elastic member (for example, a spring) 363. A rear end portion of the cylinder 31 is fixed to the second movable support 39. The second movable support 39 and the cylinder 31 are moved according to the operation of the moving motor 36. The second movable support 39 is movably mounted on the guide rails 37 fixed to the base 4. An instrument, such as an encoder, may be incorporated into each motor. The motor is feedback-controlled on the basis of output signals of the encoder.

A backflow prevention ring (not shown) is attached to a tip end (front end) of the screw 32. In a case where the screw 32 is moved toward the nozzle portion 31b in the cylinder 31, the backflow prevention ring suppresses the backflow of molten plastic material stored in a storage space 31e.

The heater 33 is attached to an outer periphery of the cylinder 31, and generates heat in a case where, for example, feedback-controlled energization is performed. The heater 33 is attached to an outer periphery of the cylinder body portion 31a and/or the nozzle portion 31b in any manner.

An overview of the operation of the injection unit 3 will be described. Heat is applied to the cylinder 31 from the heater 33, and pellets fed into the cylinder body portion 31a via the hopper 31f are melted. The screw 32 is rotated in the cylinder body portion 31a according to a rotation force generated from the plasticizing motor 34, the plastic material is fed to the front side along a helical groove of the screw 32, and the plastic material is gradually melted in this process. As the molten plastic material is fed to the front side of the screw 32, the screw 32 retreats and the molten plastic material is stored in the storage space 31e (referred to as the "plasticizing process"). The number of rotations of the screw 32 is measured using the encoder of the plasticizing motor 34. In the plasticizing process, in order to limit the sudden retreat of the screw 32, the injection motor 35 may be driven to apply a back pressure to the screw 32. The back pressure applied to the screw 32 is measured using, for example, a pressure detector. The screw 32 retreats up to a plasticizing completion position, a predetermined amount of molten plastic material is accumulated in the storage space 31e in front of the screw 32, and the plasticizing process is completed.

Subsequently to the plasticizing process, the screw 32 is moved toward the nozzle portion 31b up to a filling completion position from a filling start position according to a driving force generated from the injection motor 35, and the molten plastic material stored in the storage space 31e is fed into the mold unit 5 via the discharge port of the nozzle portion 31b (referred to as the "filling process"). The position or speed of the screw 32 is measured using, for example, the encoder of the injection motor 35. In a case where the position of the screw 32 reaches a set position, the switching of the filling process to the holding pressure process (so-called V/P switching) is performed. A position where the V/P switching is performed is also referred to as a V/P switching position. A set speed of the screw 32 may be changed depending on the position of the screw 32, a time, or the like.

In a case where the position of the screw 32 reaches a set position in the filling process, the screw 32 may be temporarily stopped at the set position, and the V/P switching may be then performed. Immediately before the V/P switching, instead of the screw 32 being stopped, the screw 32 may advance at a very low speed or retreat at a very low speed. Further, a screw position detector for measuring the position of the screw 32 and a screw speed detector for measuring the speed of the screw 32 are not limited to the encoder of the injection motor 35, and other types of detectors can be used.

Subsequently to the filling process, a holding pressure of the plastic material in front of the screw 32 is maintained at a set pressure as the screw 32 is moved to the front side, and the remaining plastic material is extruded into the mold unit 5 (referred to as the "holding pressure process"). Insufficient plastic material due to cooling contraction in the mold unit 5 can be replenished. The holding pressure is measured using, for example, a pressure detector. A set value of the holding pressure may be changed depending on a time that has passed from the start of the holding pressure process. The plastic material, which is filled in a cavity formed in the mold unit 5, is gradually cooled in the holding pressure process, and an inlet of the cavity is closed by the solidified plastic material at the time of completion of the holding pressure process. This state is referred to as a gate seal, and the backflow of the plastic material from the cavity is prevented. A cooling process is started after the holding pressure process. The plastic material filled in the cavity is solidified in the cooling process. A plasticizing process of the next molding cycle may be performed in the cooling process to shorten a molding cycle time.

Subsequently to the holding pressure process, the above-mentioned plasticizing process is performed.

The injection molding machine 1 includes a control board 7 (see FIG. 1) in which a control system for controlling the mold clamping unit 2 and/or the injection unit 3 is stored. The control system stored in the control board 7 sequentially controls the mold clamping motor 26, the ejector motor, the plasticizing motor 34, and the injection motor 35. The control system performs mold closing, mold clamping, and mold opening on the basis of the control of the mold clamping motor 26. The control system performs plasticizing, filling, and holding pressure on the basis of the control of the plasticizing motor 34 and the injection motor 35. The control system can eject molding products from the movable mold 52 of the mold unit 5 on the basis of the control of the ejector motor. The control system can position the cylinder 31 at an appropriate position on the basis of the control of the moving motor 36. The control system can also control the temperatures of the heater 33 and the mold unit 5 in addition to the above-mentioned control.

For example, a plasticizing process, a mold closing process, a mold clamping process, a filling process, a holding pressure process, a cooling process, a mold opening process, and an ejection process are performed in this order in one molding cycle. The order mentioned here is an order in which the start times of the respective processes are earlier. The filling process, the holding pressure process, and the cooling process are performed between the start of the mold clamping process and the end of the mold clamping process. The end of the mold clamping process coincides with the start of the mold opening process. A plurality of processes may be simultaneously performed to shorten the molding cycle time. For example, the plasticizing process may be performed during a cooling process of a previous molding cycle. In this case, the mold closing process may be performed at the beginning of the molding cycle. Further, the filling process may be started during the mold closing process. Furthermore, the ejection process may be started during the mold opening process.

Figure 2:
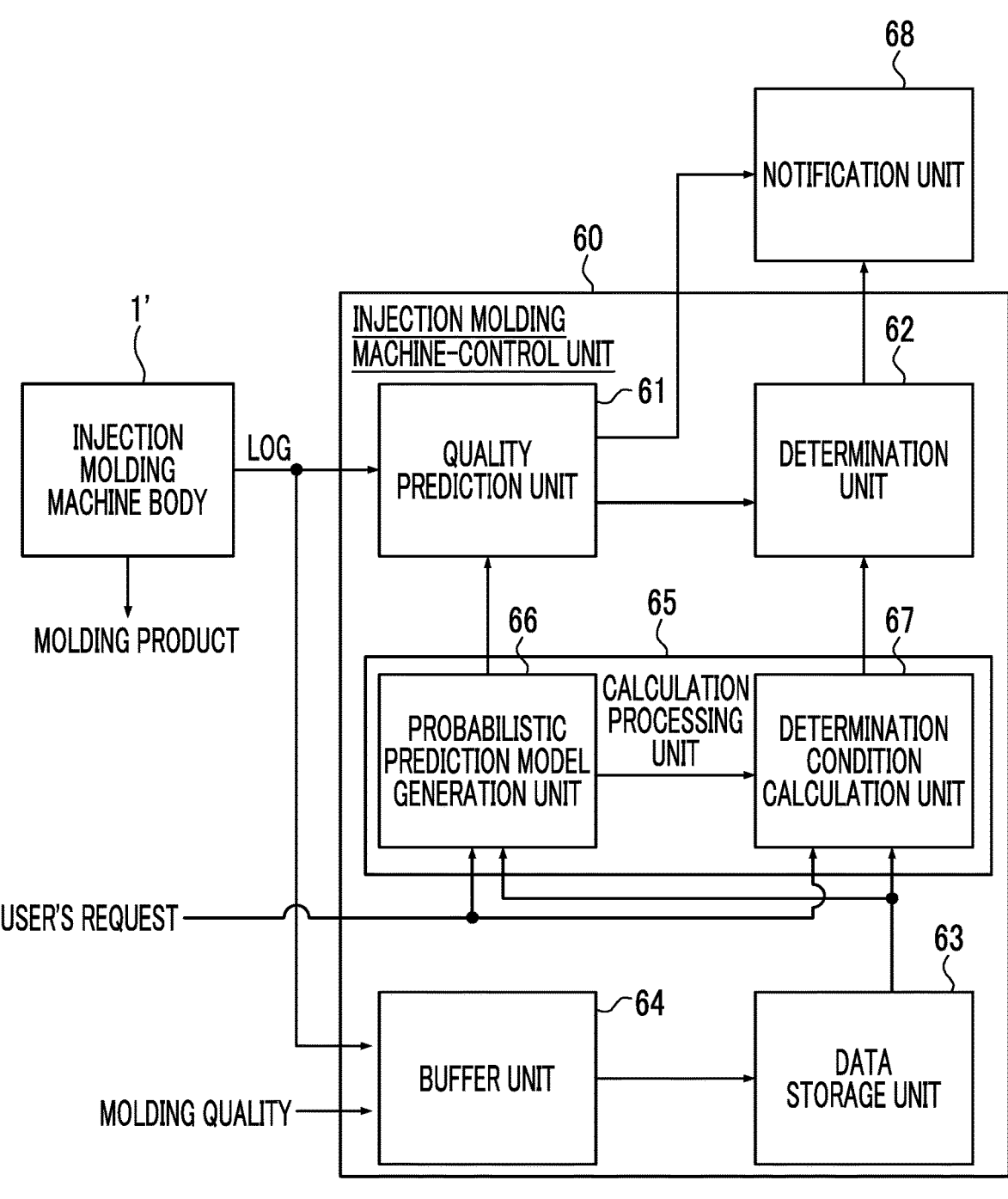
FIG. 2 is a schematic block diagram mainly showing an injection molding machine-control unit.

As shown in FIG. 2, a log including log values of 1 or more is input to an injection molding machine-control unit 60 from an injection molding machine body 1' that includes the mold clamping unit 2 and the injection unit 3 described above. The log values are variables relating to injection molding conditions or states, and include, for example, a set value that is set in the injection molding machine body 1', a sensing value that is acquired by a sensor provided in the injection molding machine body 1', or a combination thereof. Further, the log values may include the data of peripheral units and external environmental data, such as utilities, ambient temperature, and a difference in resin rods.

The injection molding machine-control unit 60 may be incorporated into the above-mentioned control board 7 or may be provided separately from the above-mentioned control board 7. The injection molding machine-control unit 60 can be embodied by a computer. For example, at least one central processing unit (CPU) and at least one memory (a hard drive or a semiconductor memory) are provided, and a program read from the memory is executed by the CPU, so that desired functions (for example, program modules, such as a quality prediction unit 61, a determination unit 62, a probabilistic prediction model generation unit 66, and a determination condition calculation unit 67 to be described later) are embodied. Some or all of the functions of the injection molding machine-control unit 60 can also be placed on a network or a cloud.

The injection molding machine-control unit 60 includes a quality prediction unit 61, a determination unit 62, a data storage unit 63, a buffer unit 64, and a calculation processing unit 65. The calculation processing unit 65 includes a probabilistic prediction model generation unit 66 and a determination condition calculation unit 67. The quality prediction unit 61 predicts the quality of a molding product from the log (that is, a plurality of log values), which is received from the injection molding machine body 1', using a probabilistic prediction model that is generated by the probabilistic prediction model generation unit 66. For example, expected values and variances relating to one or more qualities are calculated, probabilities of occurrence of one or more desired qualities are calculated, or probability density distributions relating to one or more qualities are calculated, so that this prediction is made. The determination unit 62 makes a determination on the basis of a prediction result of the quality prediction unit 61 (for example, an expected value and a variance, a probability of occurrence of a desired quality, and/or a probability density distribution). In order to make the determination of the determination unit 62, any of three categories of a non-defective product, a defective product, and inspection required may be selected, or any of two categories of whether or not inspection is required may be selected. A determination parameter (for example, threshold values) of the determination unit 62 is appropriately set, and a determination in response to a user's request (to be described later) is made. A notification unit 68 is provided to notify a user of the prediction result of the quality prediction unit 61 and/or a determination result of the determination unit 62. The notification unit 68 notifies the user of the prediction result and/or the determination result with an image, sound, flashing, or the like. The notification unit 68 can be formed of, for example, various displays (for example, a liquid-crystal display), a speaker, or a flasher in which LEDs are arranged.

A quality prediction made by the quality prediction unit 61 is made on the basis of the probabilistic prediction model that is generated by the probabilistic prediction model generation unit 66. The determination parameter (for example, threshold values), which is used for the determination of the determination unit 62, may be a determination parameter that is adjusted according to a simulation result of the determination condition calculation unit 67, but is not limited thereto.

The probabilistic prediction model generation unit 66 generates a probabilistic prediction model on the basis of training data stored in the data storage unit 63 (in some cases, a user's request in addition to the training data). The probabilistic prediction model calculates quality indexes, such as an expected value and a variance, a probability of occurrence of a desired quality, and/or a probability density distribution. Various types of models can be employed with regard to this. For example, in a case where a quality is represented by successive values, a model is generated using Bayesian linear regression. In a case where a quality is represented by discrete values, a model is generated using logistic regression. In a case where a quality is represented using the mixture of successive values and discrete values, a mixed model can be employed.

An example of a Bayesian linear regression model will be described for reference. In an example of a Bayesian linear regression model where an objective variable y can be expressed by a model in which noise having a variance of $1/\beta$ is added to a linear coupling with a descriptive variable vector x and a multivariate Gaussian distribution is assumed for the prior distribution of a coefficient thereof, a predicted distribution $p(y|x)$ of the objective variable y corresponding to the descriptive variable vector x can be calculated with a Gaussian distribution shown in Equation 1. In Equation 1, y denotes an objective variable, x denotes a descriptive variable vector, $\mu$ denotes an average, and $\sigma$ denotes a standard deviation. The average $\mu$ is calculated by Equation 2. The standard deviation $\sigma$ is calculated by Equation 3. However, m and x in Equation 2 are vertical vectors. x in Equation 3 is also a vertical vector.

$$m_N^\square$$

in Equation 2 denotes an average of a posterior distribution of a coefficient calculated by training. $S_N$ in Equation 3 denotes a covariance matrix of a posterior distribution of the coefficient calculated by training.

$$p(y|x) = N\left(y|\mu(x), \sigma_N^2(x)\right) \qquad \text{Equation 1}$$

$$\mu(x) = m_N^T x \qquad \text{Equation 2}$$

$$\sigma_N^2(x) = \frac{1}{\beta} + x^T S_N x \qquad \text{Equation 3}$$

The determination condition calculation unit 67 performs a simulation on the basis of the training data stored in the data storage unit 63, the probabilistic prediction model generated by the probabilistic prediction model generation unit 66, and a user's request, and determines a determination parameter (for example, threshold values) that is used for the determination of the determination unit 62. In some cases, the determination condition calculation unit 67 estimates a distribution of the molding quality of the next molding product from the training data (that is, a log of an actually molding quality) using a distribution of a molding quality. Further, the determination condition calculation unit 67 estimates a determination result for the molding quality of the next molding product on the basis of the determination parameter (optionally, the uncertainty of prediction in addition to the determination parameter). Since the determination condition calculation unit 67 can simulate a confusion matrix on the basis of an estimated molding quality, a determination result estimated about the estimated molding quality, and a true molding quality (based on, for example, the training data), an inspection ratio, a non-defective product discard ratio, and a defective product release ratio can also be estimated.

For example, a mixing matrix is represented by the following table. A of a cell address (1:1) indicates the number of samples in which a truly non-defective product is correctly estimated as a non-defective product. B of a cell address (1:2) indicates the number of samples in which a truly defective product is erroneously estimated as a non-defective product. Each of C of a cell address (2:1) and D of a cell address (2:2) indicates the number of samples that are to be inspected for the determination of whether the sample is a non-defective product or a defective product. E of a cell address (1:3) indicates the number of samples in which a truly non-defective product is erroneously estimated as a defective product. F of a cell address (2:3) indicates the number of samples in which a truly defective product is correctly estimated as a defective product.

TABLE 1

|  |  | Truth | |
| --- | --- | --- | --- |
|  |  | Non-defective product | Defective product |
| Prediction | Non-defective product (=shipment) | A | B |
|  | Inspection | C | D |
|  | Defective product (=disposal) | E | F |

The inspection ratio, the non-defective product discard ratio, and the defective product release ratio can be calculated as follows.

Inspection ratio=(C+D)/(sum of A to F)

Non-defective product discard ratio=E/(E+F)

Defective product release ratio=B/(A+B)

In a case where the determination parameter is changed, a determination result is changed with the change of the determination parameter. Accordingly, the inspection ratio, the non-defective product discard ratio, and the defective product release ratio are changed. The determination condition calculation unit 67 can change the determination parameter until any one or more of the inspection ratio, the non-defective product discard ratio, and the defective product release ratio satisfy a user's request, and can determine a determination parameter satisfying the user's request. In this way, the determination condition calculation unit 67 probabilistically deals with a distribution of a molding quality and a predicted distribution of a molding quality to calculate a determination parameter that allows the production process required by a user to be achieved. A specific method thereof is not limited to the above-mentioned method.

The data storage unit 63 is a database in which the training data are stored. Log values included in a log and molding qualities are stored in the data storage unit 63 in association with each other. For example, the training data are formed of (i) one or more log values and (ii) at least one quality value that are associated with each other. All of the log values and the quality values take values of real numbers, but are not necessarily limited thereto. The log values may be successive or discrete values. The qualities may be successive or discrete values.

Non-limiting examples of a log X and a quality value Y can be presented in Table 2. Of course, logs X and quality values Y other than those presented in Table 2 can also be employed. For example, any of log values $X_1$ to $X_4$ and qualities $Y_1$ to $Y_4$ presented in Table 2 can also be excluded. Various log values can be employed as a descriptive variable, and likewise, various quality values can be employed as an objective variable. Typically, the log X is formed as a combination of log values $X_1$ to $X_n$ (n is a natural number of 2 or more) (that is, $X=(X_1, X_2, \text{and } X_3 \text{ to } X_n)$). $X_1$ to $X_4$ shown in Table 2 are understood as non-limiting examples in regard to individual contents and orders thereof. The number of log values is also set to four for easy understanding. Since the number of log values is generally ten or more in the injection molding machine, the directionality of a change in quality corresponding to a change in log value also varies.

TABLE 2

|  | Training data_1 | Training data_2 | Training data_3 |
| --- | --- | --- | --- |
| Log X | | | |
| $X_1$: temperature [° C.] | 10 | 14 | 16 |
| $X_2$: speed [mm/s] | 9 | 8.5 | 7 |
| $X_3$: time [S] | 20 | 25 | 30 |
| $X_4$: pressure [Pa] | 5 | 6 | 7 |
| Quality Y (successive values) | | | |
| $Y_1$: mass [g] | 5 | 6 | 6.5 |
| $Y_2$: dimension [cm] | 10 | 9.5 | 8 |

TABLE 2-continued

| | Training data_1 | Training data_2 | Training data_3 |
|---|---|---|---|
| Quality Y (discrete values) | | | |
| $Y_3$: presence or absence of burr | 1 | 1 | 0 |
| $Y_4$: presence or absence of sink mark | 0 | 0 | 1 |

In Table 2, with regard to the quality of discrete values, a first real number "1" is assigned to the presence of burrs or sink marks, and a second real number "0" is assigned to the absence of burrs or sink marks. Discrete quality evaluation is not limited to an aspect in which two evaluation values are used, and three or more evaluation values may also be used.

Figure 3A:
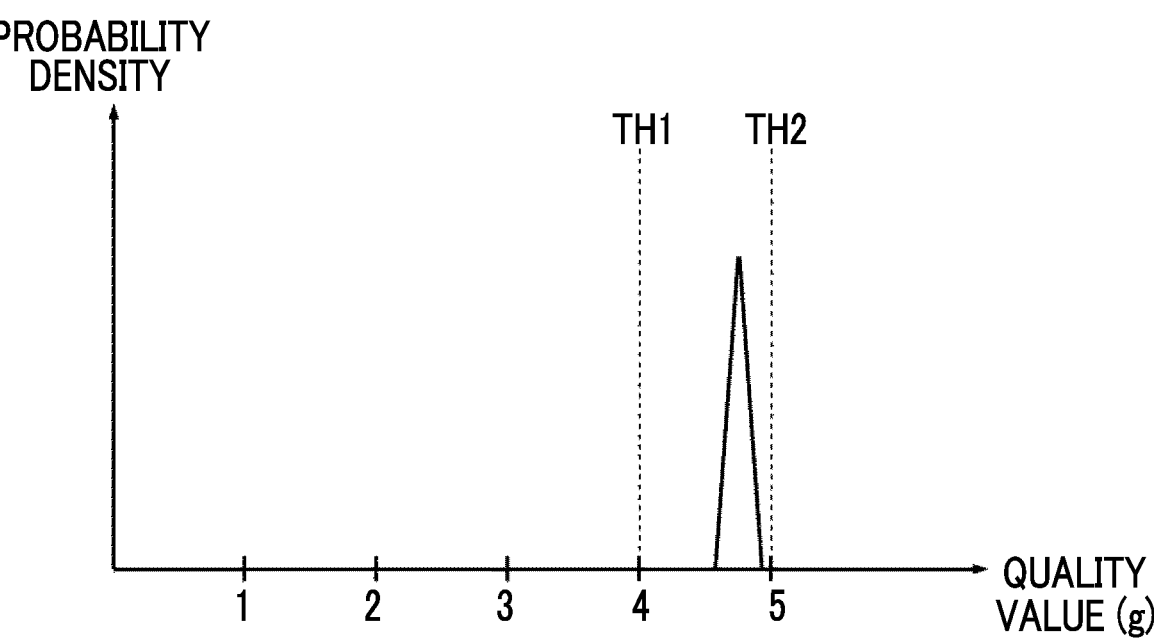
FIGS. 3A and 3B are diagrams showing a relationship between a probability density and threshold values.
Figure 3B:
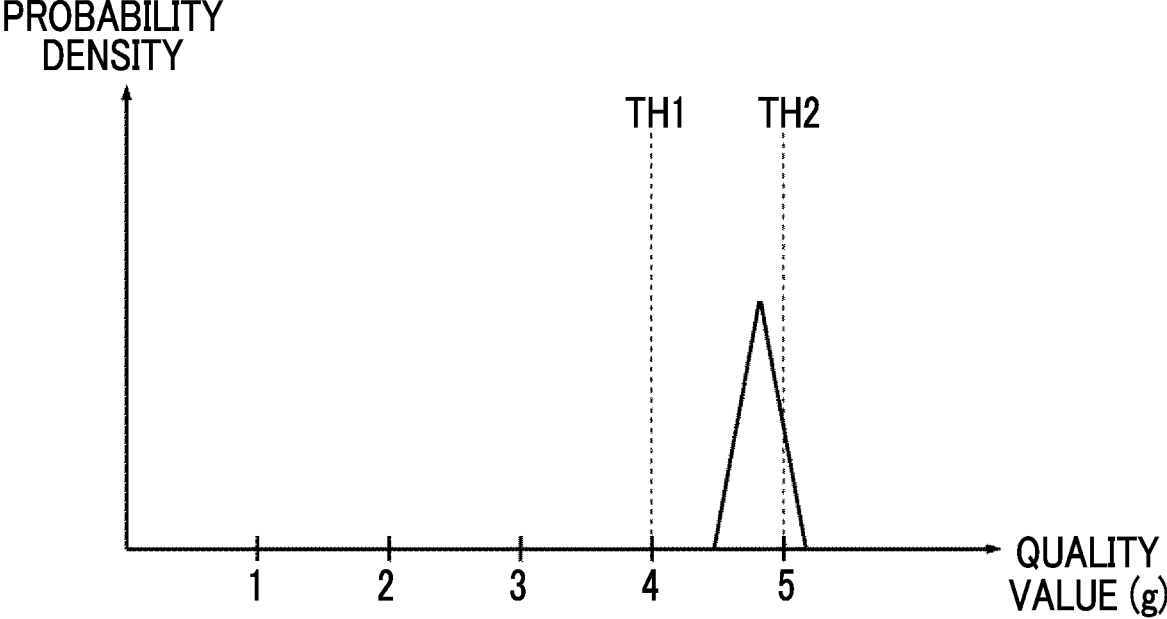

In cases shown in FIGS. 3A and 3B, the quality prediction unit 61 generates a probability density distribution of a quality using a probabilistic prediction model and optionally calculates a non-defective product rate. In FIGS. 3A and 3B, the mass (g) of a molding product is selected as a quality, a lower limit threshold value TH1 is set to 4 (g), and an upper limit threshold value TH2 is set to 5 (g). In the case of FIG. 3A, a unimodal distribution of a probability density is present between the lower limit threshold value and the upper limit threshold value. In the case of FIG. 3B, a unimodal distribution of a probability density and the upper limit threshold value are superimposed. A non-defective product probability, which is obtained in a case where a probability density is integrated between the lower limit threshold value and the upper limit threshold value, is 99.999% or more in the case of FIG. 3A and is a value (for example, 80%) lower than that of FIG. 3A in the case of FIG. 3B. Notification of the prediction result of the quality prediction unit 61 (the probability density distribution and/ or the non-defective product probability) is sent to a user via the notification unit 68. The user determines whether to inspect a molding product on the basis of this information.

The determination unit 62 makes a determination on the basis of the prediction result of the quality prediction unit 61 (an expected value and a variance, a probability of occurrence, a probability density distribution, and/or a non-defective product probability). A simple determination that can be made by the determination unit 62 is to evaluate the prediction result of the quality prediction unit 61 with one or more threshold values. For example, a non-defective product probability is compared with one threshold value, and it is determined that inspection is required in a case where the non-defective product probability is equal to or less than the threshold value. As an alternative example, a non-defective product probability is compared with an upper limit threshold value and a lower limit threshold value, it is determined that a product is a non-defective product in a case where the non-defective product probability exceeds the upper limit threshold value, it is determined that inspection is required in a case where the non-defective product probability is between the upper limit threshold value and the lower limit threshold value, and it is determined that a product is a defective product (that is, inspection is not required) in a case where the non-defective product probability is equal to or less than the lower limit threshold value. In a case where a user interface is appropriately set, the threshold value can be adjusted by a user.

The determination parameter used in the determination unit 62 is set to respond to user's requests relating to three points of view of (i) a ratio of defective products that are released in the market (that is, defective product release ratio=the number of defective products/the total number of molding products), (ii) a ratio of molding products that are inspected (that is, inspection ratio=the number of inspected molding products/the total number of shipped molding products), and (iii) a ratio of molding products that are discarded as defective products despite being non-defective products having a relatively good molding quality (that is, non-defective product discard ratio=the number of non-defective products/the total number of discarded molding products). Although this feature is optional, the determination condition calculation unit 67 is used to determine or adjust the determination parameter used in the determination unit 62.

The determination condition calculation unit 67 calculates a probability density distribution of a quality using the training data stored in the data storage unit 63 (optionally, past quality prediction results) and the probabilistic prediction model generated by the probabilistic prediction model generation unit 66, and applies threshold values to the probability density distribution to simulate what values any or all of the defective product release ratio, the inspection ratio, and the non-defective product discard ratio described above will be. The above-mentioned confusion matrix can be used for the calculation of the defective product release ratio, the inspection ratio, and the non-defective product discard ratio. Log data on which the past quality prediction results are based may also be used.

For example, user's requests relating to any one, two, or all of the three points of view described above are input to the determination condition calculation unit 67. The determination condition calculation unit 67 simulates whether or not a determination parameter of the determination unit 62 satisfying a user's request can be set. In a case where a determination parameter can be set, the parameter is used in the determination unit 62. In a case where a determination parameter cannot be set, the determination condition calculation unit 67 prompts a user to change the user's request.

For example, an interval between the upper limit threshold value and the lower limit threshold value is narrowed such that a user's request relating to the inspection ratio is satisfied, and a defective product release ratio in this case is calculated. In a case where the calculated defective product release ratio satisfies a user's request relating to a defective product release ratio, it is determined that the upper limit threshold value and the lower limit threshold value can be employed.

Figure 4:
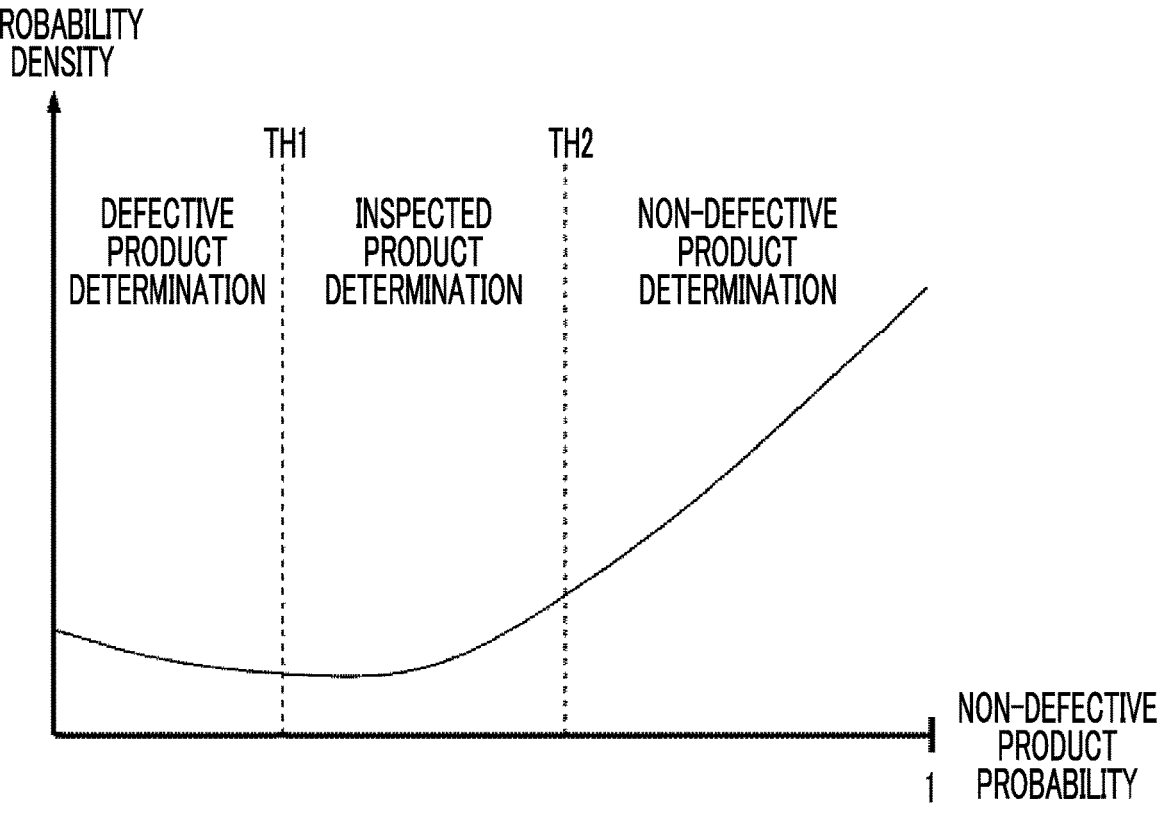
FIG. 4 is a diagram showing an example of a probability density distribution.

Instead of causing a determination parameter of the determination unit 62 to be automatically set using the determination condition calculation unit 67, a probability density distribution calculated by the determination condition calculation unit 67 may be presented to a user to allow the user to adjust threshold values (see FIG. 4). An appropriate user interface (for example, a touch panel) for the adjustment of a threshold value is prepared. The threshold values TH1 and TH2 are adjusted by a user, and the defective product release ratio, the inspection ratio, and the non-defective product discard ratio described above are calculated according to the adjusted threshold values.

In a case where the determination unit 62 determines that a molding product is required to be inspected, a user inspects the molding product and measures or determines a molding quality. The molding quality measured or determined in this way is input to the buffer unit 64, is held in association with a log when the molding product is manufactured, and is subsequently registered in the data storage unit 63. In a case where the molding quality is registered in the data storage unit 63, the prediction model or the determination parameter may be updated. In order to reduce the bias of the training data registered in the data storage unit 63, the molding product determined as a non-defective product or a defective product may be inspected regularly or randomly. Accordingly, the bias of the training data registered in the data storage unit 63 is reduced, so that the reliability of the probabilistic prediction model generated by the probabilistic prediction model generation unit 66 is improved. In a case where inspection to be performed regularly or randomly is performed on the basis of a set inspection ratio, an increase in the overall inspection ratio can be prevented.

Figure 5:
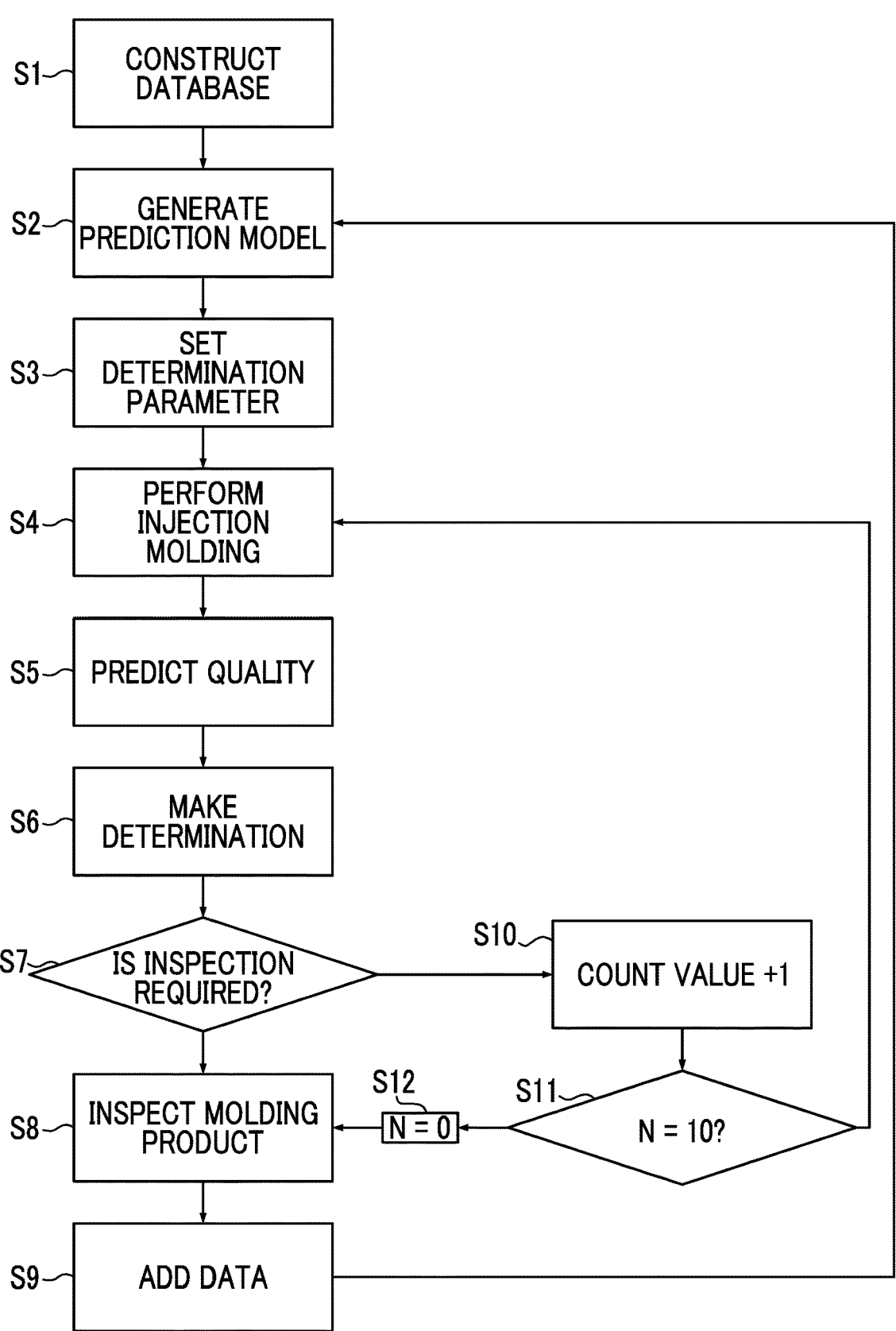
FIG. 5 is a schematic flowchart showing an operation of the injection molding machine-control unit.

The operation of the above-mentioned injection molding machine-control unit 60 will be described with reference to FIG. 5. First, a database is constructed (S1). Specifically, training data required to generate a probabilistic prediction model are stored in the data storage unit 63. Then, the probabilistic prediction model is generated (S2). Specifically, the probabilistic prediction model generation unit 66 generates a probabilistic prediction model using the training data stored in the data storage unit 63 (data in which log values and quality values are associated with each other). The probabilistic prediction model can be generated using various methods, such as Bayesian linear regression and logistic regression. Then, a determination parameter is set (S3). The determination parameter (for example, threshold values) of the determination unit 62 may a determination parameter that is designated by a user or adjusted according to a simulation result of the determination condition calculation unit 67. The mass production of a molding product is prepared in this way.

After that, injection molding is performed (S4). Specifically, the injection molding machine body 1' operates, so that a molding product is obtained. At the same time, a log is output from the injection molding machine body 1'. Then, the quality of the molding product is predicted (S5). Specifically, the quality prediction unit 61 predicts the quality of the molding product from the log, which is received from the injection molding machine body 1', using the probabilistic prediction model generated by the probabilistic prediction model generation unit 66. For example, the quality prediction unit 61 calculates an expected value and a variance of the quality of the molding product. Only an expected value is estimated in point estimation, but information on certainty, such as a variance, is obtained as well in a case where a probabilistic method is employed. The quality prediction unit 61 can also calculate a probability density distribution using a publicly known method.

After that, a determination is made (S6). Specifically, the determination unit 62 makes a determination on the basis of a prediction result of the quality prediction unit 61 (for example, an expected value and a variance, a probability of occurrence of a desired quality, and/or a probability density distribution).

In a case where inspection is required as a result of the determination (S7), a user inspects a molding product (S8). The user inspects the molding product, so that a quality value associated with the log is obtained. Accordingly, the user can register this data in the data storage unit 63 as necessary (S9).

In a case where inspection is not required as a result of the determination (S7), the count value is increased, and the next injection molding (S4) is performed. The molding product is mass-produced by such a process. In order to remove the bias of the data registered in the data storage unit 63, the user may inspect a molding product (a non-defective product or a defective product) that is determined as a molding product that is not required to be regularly inspected. For example, the number of cycles in which it is determined that inspection is not required is counted by a counter, and inspection is performed in a case where a count value reaches a predetermined value. For example, in a case where inspection is not required, the count value of the counter is increased (S10). In a case where a count N reaches 10 (S11), the count value returns to an initial value (S12) and a user inspects the molding product (S8). The bias of the data stored in the data storage unit 63 is reduced in this way. As a result, the reliability of the probabilistic prediction model can be improved.

Figure 6:
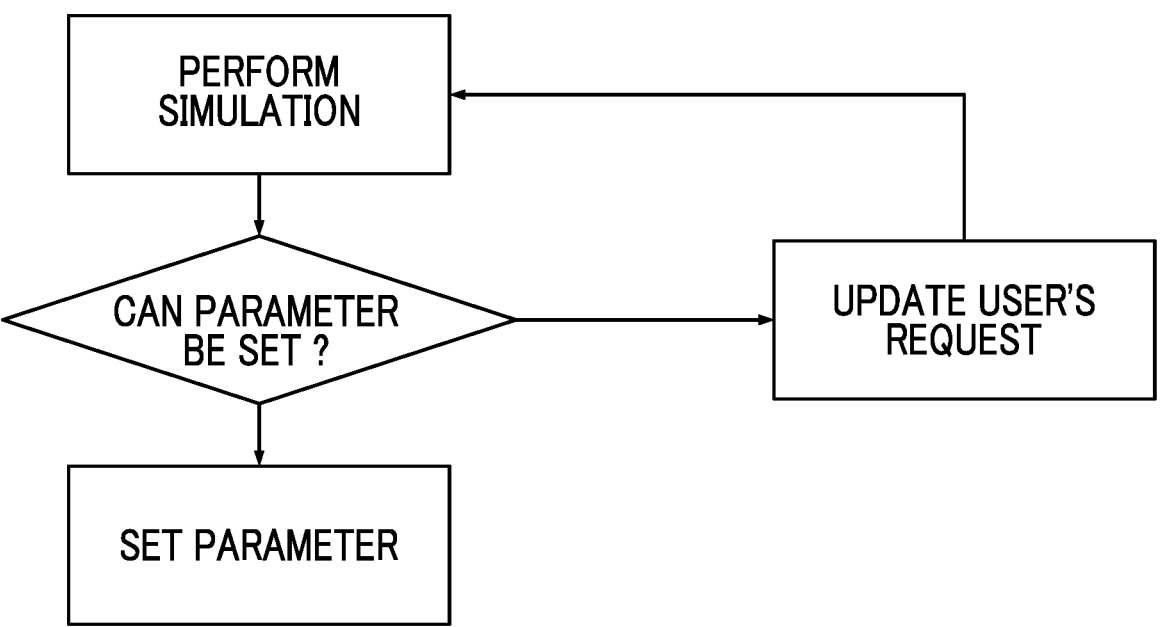
FIG. 6 is a schematic flowchart showing a simulation procedure.

The determination of whether or not the determination parameter of the determination unit 62 can be set by the determination condition calculation unit 67 will be described with reference to FIG. 6. First, the determination condition calculation unit 67 performs a simulation on the basis of the training data stored in the data storage unit 63, the probabilistic prediction model generated by the probabilistic prediction model generation unit 66, and a user's request (S11). For example, the above-mentioned confusion matrix can be used for the calculation of the defective product release ratio, the inspection ratio, and the non-defective product discard ratio. As a result, in a case where a determination parameter (for example, threshold values) used for the determination of the determination unit 62 can be set, the determination parameter is used for the determination of the determination unit 62 (S12). In a case where the determination parameter cannot be set, an update of the user's request is requested (S13).

It should be understood that the invention is not limited to the above-described embodiment, but may be modified into various forms on the basis of the spirit of the invention. Additionally, the modifications are included in the scope of the invention.

What is claimed is:

1. A quality prediction device comprising:
   a processor configured to execute
       generating of a probabilistic prediction model on the basis of a plurality of training data in which a log relating to a molding operating condition or to a state of a molding machine and a quality value of a molding product corresponding to the log are associated with each other,
       setting a determination parameter, the determination parameter being designated by a user or adjusted according to a simulation result of the processor,
       performing an injection molding and outputting the log from an injection molding machine body,
       predicting a quality index of the molding product from the log using the probabilistic prediction model, and
       making a determination whether inspection is required by comparing the predicted quality index to the determination parameter.

2. The quality prediction device according to claim 1, wherein the quality index indicates at least one of an expected value and a variance of the molding product, a probability of occurrence of a desired quality of the molding product, and a probability density distribution of a quality of the molding product.

3. The quality prediction device according to claim 1, wherein the determination parameter is adjustable.

4. The quality prediction device according to claim 1, wherein the probabilistic prediction model is updated according to newly acquired training data.

5. The quality prediction device according to claim 1, wherein the processor is further configured to execute:
   obtaining and registering the quality value associated with the log in response to the determination that the inspection is required, and performing next injection molding when a predetermined condition is met in response to the determination that the inspection is not required.

6. The quality prediction device according to claim 1, wherein the processor is further configured to execute:

notifying the determination whether the inspection is required to a user.

7. A quality prediction method comprising:

generating a probabilistic prediction model on the basis of a plurality of training data in which a log relating to a molding operating condition or to a state of a molding machine and a quality value of a molding product corresponding to the log are associated with each other; and setting a determination parameter, the determination parameter being designated by a user or adjusted according to a simulation result, performing an injection molding and outputting the log from an injection molding machine body, predicting a quality index of the molding product from the log using the probabilistic prediction model, and making a determination whether inspection is required by comparing the predicted quality index to the determination parameter.

8. The quality prediction method of claim 7, further comprising:

obtaining and registering the quality value associated with the log in response to the determination that the inspection is required, and performing next injection molding when a predetermined condition is met in response to the determination that the inspection is not required.

9. The quality prediction method of claim 7, further comprising:

notifying the determination whether the inspection is required to a user.

10. A non-transitory computer readable medium storing a program that causes a computer to execute a process, the process comprising:

generating a probabilistic prediction model on the basis of a plurality of training data in which a log relating to a molding operating condition or to a state of a molding machine and a quality value of a molding product corresponding to the log are associated with each other; and setting a determination parameter, the determination parameter being designated by a user or adjusted according to a simulation result, performing an injection molding and outputting the log from an injection molding machine body, predicting a quality index of the molding product from the log using the probabilistic prediction model, and making a determination whether inspection is required by comparing the predicted quality index to the determination parameter.

11. The non-transitory computer readable medium of claim 10, wherein the process further comprises:

obtaining and registering the quality value associated with the log in response to the determination that the inspection is required, and performing next injection molding when a predetermined condition is met in response to the determination that the inspection is not required.

12. The non-transitory computer readable medium of claim 10, wherein the process further comprises:

notifying the determination whether the inspection is required to a user.

\* \* \* \* \*